United States Patent [19]

Munn

[11] Patent Number: 4,505,411

[45] Date of Patent: Mar. 19, 1985

[54] MOTORCYCLE FIREARM CARRIER

[76] Inventor: Laurie P. Munn, 17544 DuBarry, Bellflower, Calif. 90706

[21] Appl. No.: 532,837

[22] Filed: Sep. 16, 1983

[51] Int. Cl.³ .............................................. B62J 9/00
[52] U.S. Cl. ................................... 224/39; 224/32 R; 224/913; 280/289 A
[58] Field of Search ............... 224/273, 275, 279, 280, 224/282, 30 R, 32 R, 39, 42.42, 913; 280/289 R, 289 A

[56] References Cited

U.S. PATENT DOCUMENTS

| | | | |
|---|---|---|---|
| 567,162 | 9/1896 | Peirce | 224/32 R |
| 749,865 | 1/1904 | Jarvis | 224/32 R |
| 2,407,884 | 9/1946 | Johnston | 224/39 R |
| 4,247,030 | 1/1981 | Amacker | 224/913 |

*Primary Examiner*—Stephen Marcus
*Assistant Examiner*—David Voorhees
*Attorney, Agent, or Firm*—Michael Bak-Boychuk

[57] ABSTRACT

An adapter for use with law enforcement motorcycles, conformed to be received between the saddlebag cage and the frame thereof, said adapter including a lock assembly sized to engage the lateral surfaces of a firearm to oppose any chambering movement therein. The adapter is generally shaped as a convoled sheet metal plate having at the rear end thereof a support for the handle portion of the firearm and at the forward end a mount for supporting the barrel. The alignment of the rear and forward mounts and the central lock assembly align the barrel of the firearm adjacently below the seat of the motorcycle. Thus the firearm is shielded from debris and damage by the seat and by virtue of the mounting thereof is secured against inadvertent chambering of a round in case of an accident.

4 Claims, 6 Drawing Figures

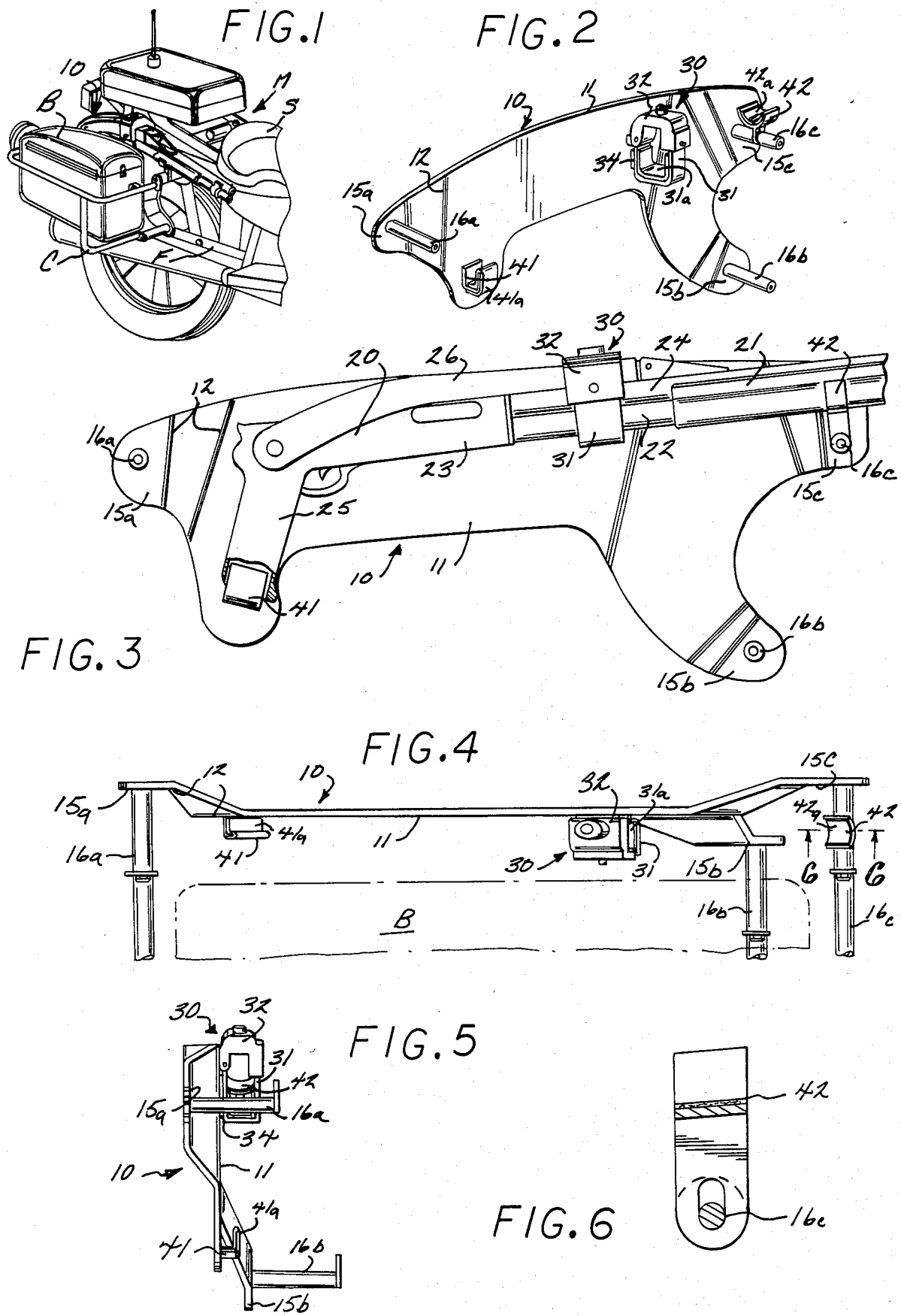

MOTORCYCLE FIREARM CARRIER

BACKGROUND OF THE INVENTION

1. Field of the Invention

The present invention relates to firearm carriers, and more particularly to firearm carriers adapted for mounting on motorcycles.

2. Description of the Prior Art

Firearm carriers of various forms have been known in the past. Typically, such firearm carriers are adapted to support or engage firearms within the confines of a vehicle and because in such use the firearm is carried unloaded, very little safety allowance has been made against inadvertence discharge. One should note that most statutory schemes of the various states of the United States, and other jurisdictions, require that a firearm carried in a vehicle be carried in an unloaded state. Thus carrier structures developed in the past are typically directed to provide a safe engagement, i.e., engagement against inadvertent release, and not against possible discharge in the course of a vehicular accident.

Firearms carried by law enforcement personnel, however, are most frequently carried with rounds in the magazine and the possibility of inadvertent chambering of the round in the course of an accident and subsequent discharge is therefore real. Particularly when carried on a motorcycle there is little structural shielding of such a firearm against impact or jarring in the event of an accident. Thus, a policeman driving a motorcycle constantly runs the risk of inadvertent discharge even though extensive safety precautions are taken, as for example, by keeping the round unchambered in the firearm.

SUMMARY OF THE INVENTION

Accordingly, it is the general purpose and object of the present invention to provide a firearm carrier conformed for installation onto the side of a motorcycle which in the provisions thereof precludes the chambering of a round in the course of a collision.

Other objects of the invention are to provide a firearm carrier which conveniently adapts to the structure of a motorcycle and which by the geometry thereof shields the firearm from impact and debris.

Yet additional objects of the invention are to provide a firearm carrier adapted to transport firearms ready for use.

Additional objects of the invention are to provide a firearm carrier for use with a motorcycle which incorporates locking provisions to safeguard the firearm.

Briefly, these and other objects are accomplished within the present invention by conforming a firearm carrier in the manner of a convolved plate having a planform selected to mate with the fastening protrusions attaching the protective cage around a motorcycle saddlebag. This plate is then provided with a plurality of separators or standoffs at each fastener point and when installed onto the motorcycle will therefore provide a gap or spacing between the saddlebag and the motorcycle frame in which a firearm can be received. The firearm itself may be stored or supported by a handle support on the rear end of the plate and a barrel support at the front, both of which being shaped in the manner of hangers or U-shaped upwardly directed brackets for easy firearm removal. Attached between the barrel and handle supports is a firearm lock assembly comprising a lower U-shaped support pivotally attached to a U-shaped locking mechanism which, together, form an opening sized to surround the lateral surfaces of the firearm. The geometric placement of this locking assembly is selected to engage the firearm at a point between the pump mechanism thereof and the chamber. In this manner the rearward articulation of the pump mechanism is limited by the locking assembly, thus precluding the inadvertent chambering of any rounds into firing alignment. Moreover, the geometric arrangement of the front and rear supports together with the deployment of the locking assembly are such as to align the barrel of the firearm adjacently below the motorcycle seat. Thus the firearm is shielded from the side and the rear by the structure of the saddlebag and its attendant frame and from the front by the seat and any occupant thereon. This allows for the transport of a firearm ready for use, particularly firearms of the type provided with pump mechanism, the firearm of preferred configuration for emergency defensive use.

BRIEF DESCRIPTION OF THE DRAWING

FIG. 1 is a perspective illustration of a rear portion of a motorcycle incorporating a carrier constructed according to the invention herein;

FIG. 2 is yet another perspective illustration illustrating the carrier in its separate form;

FIG. 3 is a side view of the inventive carrier having a firearm mounted therein;

FIG. 4 is a top view of the carrier shown in FIG. 3;

FIG. 5 is a rear view of the inventive carrier; and

FIG. 6 is a detail side view of the front barrel mount on the inventive carrier, taken along lines 6—6 of FIG. 4.

DESCRIPTION OF THE SPECIFIC EMBODIMENT

As shown in FIGS. 1-3 a motorcycle, generally designated by the symbol M, is typically characterized by a seat S supported on a frame F which also supports the necessary power plant, the road wheels and any storage containers or fixtures typified by the saddlebags B. In conventional practice this type of a vehicle, when configured for highway patrol use, includes various protective structures forming a cage or geometric envelope to shield the occupant and any of the equipment stored in the bags B from direct impact in the event of a collision. Thus, for example, the saddlebags B may be surrounded by a cage C of tubular metal configuration, the cage C, in turn, connecting to the motorcycle frame F for any force transfer.

Typically, the cage C is generally configured as a plurality of U-shaped or L-shaped tubular members having the free ends thereof provided with conventional fastener attachments picking up fastener points or fixtures on the motorcycle frame. Thus, the cage C is fastened to extend laterally outward from the motorcycle frame both protecting the relatively soft structure of the saddlebag B and the body of the operator sitting on the seat S.

Accordingly, cage C, together with various other projections on a motorcycle, forms a geometric envelope within which the body of the user will be protected from at least some of the collision events.

In the recent past acts of violence directed at the patrolmen have increased with alarming frequency. Accordingly, to respond to this increased violence the firearm complement carried by each patrolman has increased, the patrolman now being provisioned with pump loaded shotguns carried on the motorcycle for response to such threats. The exigencies of use of these additional arms are such that little time is allowed to the patrolman to load the firearm and to get himself ready. Thus the typical practice dictates that the firearm at least include shells in the magazine thereof which may be conveniently chambered in the course of deployment. Accordingly, the firearm itself has become an additional source of potential injury in the course of a collision and considerations are therefore required to reduce this newly generated potential risk.

To accommodate the foregoing considerations an adapter generally designated by the numeral 10 is provided, comprising a sheet metal plate or support structure 11 of a planform selected to extend to the various cage attachment points on the frame F of the motorcycle, the support structure 11 being furthermore convolved along bend lines 12 to conform with the geometry of the frame. Thus, for example, structure 11 may include the three or more fastener connections or fittings coinciding with the free ends of the cage C, each fitting being formed on a planform extension shown herein as extensions 15(a), 15(b) and 15(c). Each such extension may then be fixed to a cantelevered tubular spacer, respectively shown as spacers 16(a), 16(b) and 16(c), each aligned for insertion between the free ends of cage C and the corresponding fastener provisions on the frame F. These spacers then provide the requisite gap between the structure of the saddlebag B and the adjacent surfaces of the frame F within which a firearm 20 may be received.

Characteristically, firearm 20 is provided with a pump handle 21 mounted on a pump linkage 22 extending rearwardly to a loading mechanism 23 which conventionally includes various mechanical provisions for loading a cartridge or shell into the chamber of the forwardly directed barrel 24. Additionally the firearm 20 may include the conventional features of a trigger adjacent a grasping handle 25 and may be provided with a folding stock 26 for convenience in storage.

While there are many conventional models of this firearm, a shotgun made by the Remington Corporation under the model designation number 870 exemplifies the foregoing firearm configuration and reference may be had to the literature offered by the manufacturer for any further details thereof. Firearms of this kind are typified by the necessity of a predetermined chambering stroke of the pump handle 21 along the pump linkage 22 and unless this stroke is completed the chambering of the round will not occur. This chambering limit may be blocked by way of a locking mechanism 30 mounted on the support structure 11, the mechanism 30 comprising a U-shaped lower support bracket 31 pivotally attached to a U-shaped lock 32, the lock and the bracket cooperating to define an interior opening 33 conformed to surround the barrel 24 and the pump linkage 22 while interfering with the advancement of the pump handle 21. The attachment of the lock assembly 30 may be achieved by way of a spacer 34 between the pivotal end of the bracket 31 and the opposed surface of the structure 11, bracket 31 being of a thicker material and its attachment in the event of a collision will form the weakest structural link. In this manner the firearm will separate with the lock assembly in place during a major impact. The width of the support bracket 31, furthermore, is selected such that the positioning thereof on the pump linkage 22 will preclude chambering of the round.

Accordingly, the firearm 20, in the course of a collision, will either remain with the motorcycle or will separate along the attaching juncture of the bracket 31, in either case precluding the chambering of a round.

The attachment or alignment of the firearm 20 may be further controlled by way of a rear bracket 41 attached on support 11 adjacent the spacer 16a and conformed to engage the handle 25 of the firearm. At the front a barrel support 42 may be provided on the spacer 16c, the relative positioning of bracket 41, lock assembly 30 and support 42 directing the barrel 24 of the forearm into alignment subjacent the seat S of the motorcycle.

These geometric provisions thus deploy the firearm in a position convenient for withdrawal while at the same time directing any exposure thereof away from the potential incidents that may cause discharge. Additionally, the thickness and structural rigidity of the locking assembly 30 is selected to be substantially stronger than support structure 11 with the result that any collision will at best entail the separation of the firearm in its locked state.

Thus the firearm is conveniently stored in a tucked-away position and regardless of the collision incident little danger is presented for inadvertent discharge or unauthorized use. This manner of attachment is particularly useful, according to the illustrations in FIGS. 2, 4, 5 and 6 since the structural element 11 may be conveniently convolved to mate with various frame configurations. Accordingly, motorcycle configurations of various shape can be accommodated through the simple expedient of selecting the appropriate planform and the bending convolutions. Moreover the structure 11, in and of itself, does not detract from the structural rigidity of the cage C since all the fastened portions are carried directly through the spacers 16a, 16b and 16c from the cage to the frame of the motorcycle. Vibration, road shock and other incidents of wear may be conveniently eliminated by resilient padding 41a, 42a and 31a within the brackets 41 and 42 and the lock assembly 30 rendering the foregoing adapter convenient in the use thereof and simple in manufacture.

Obviously, many modifications and changes may be made to the foregoing description without departing from the spirit of the invention. It is therefore intended that the scope of the application be determined solely on the claims appended hereto.

What is claimed is:

1. In a motorcycle including a frame provided with a seat for the user and a storage container surrounded by a cage extending from said frame, the improvement comprising:

an adapter inserted between said frame and said cage including spacers connecting said cage to said frame and a support plate secured to said spacers, said support plate including a lock assembly conformed to receive the pump mechanism of a firearm for opposing the articulation thereof and a front and rear support for aligning the barrel of said firearm received in said lock assembly into alignment subjacent said seat.

2. Apparatus according to claim 1 wherein:

said lock assembly includes a lower U-shaped bracket attached to said support plate and an upper U-shaped lock mechanism pivoted from said bracket, said bracket and lock mechanism cooperating to define an interior opening conformed to receive said pump mechanism of said firearm.

3. Apparatus according to claim 2 wherein:
said lock assembly is made of a material thickness greater than said support plate.

4. Apparatus according to claim 3 wherein:
said front and rear supports each comprise an upwardly directed bracket conformed to receive said firearm.

* * * * *